S. O. MARAK.
ICE CUTTING MACHINE.
APPLICATION FILED OCT. 31, 1912.
1,106,955.
Patented Aug. 11, 1914.
3 SHEETS—SHEET 2.
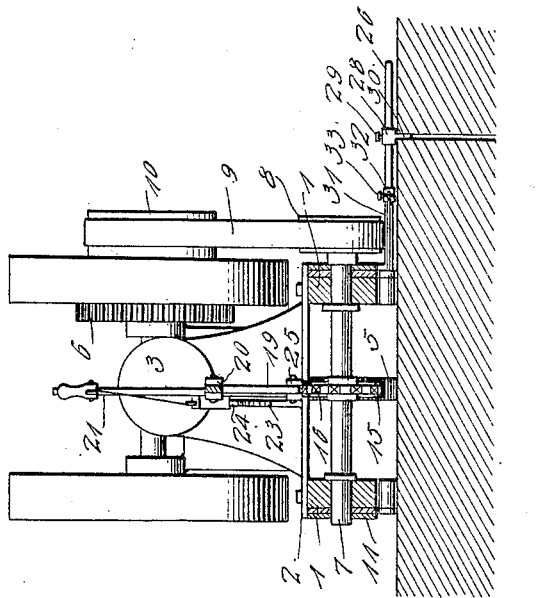
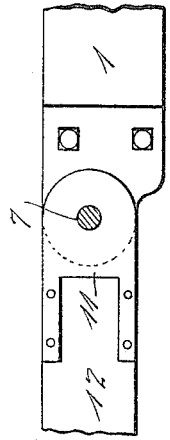
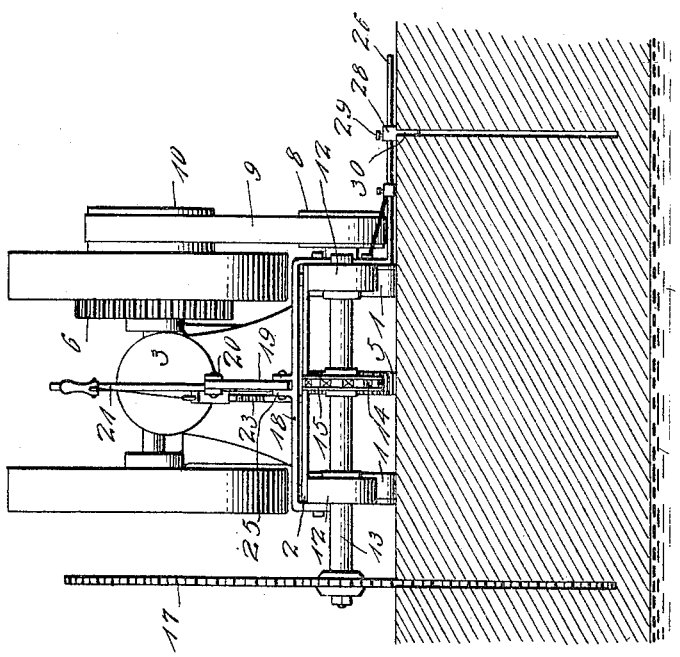
Witnesses
J. R. Pierce
C. E. Hunt
Inventor
Stanley O. Marak
By H. B. Willson & Co.
Attorneys

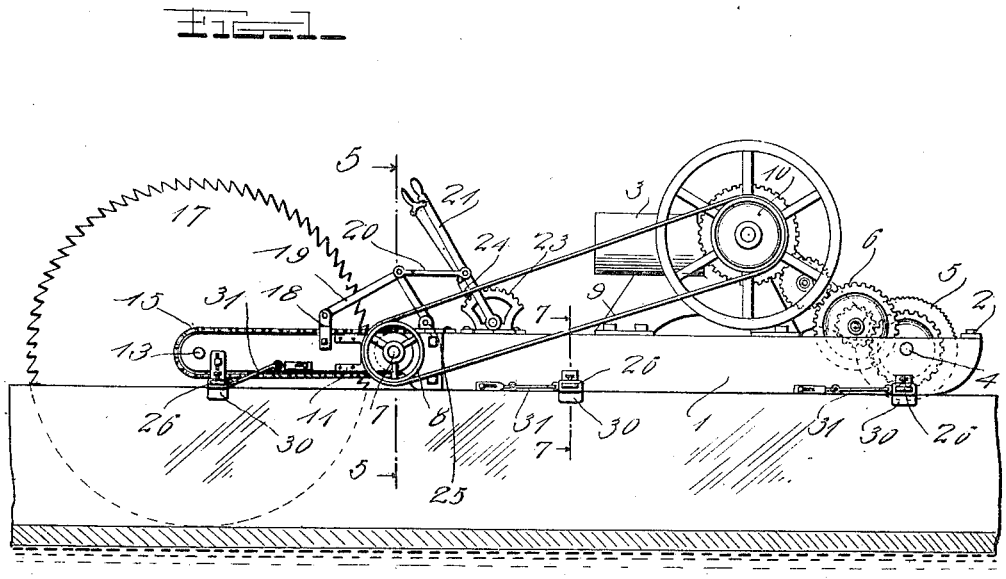

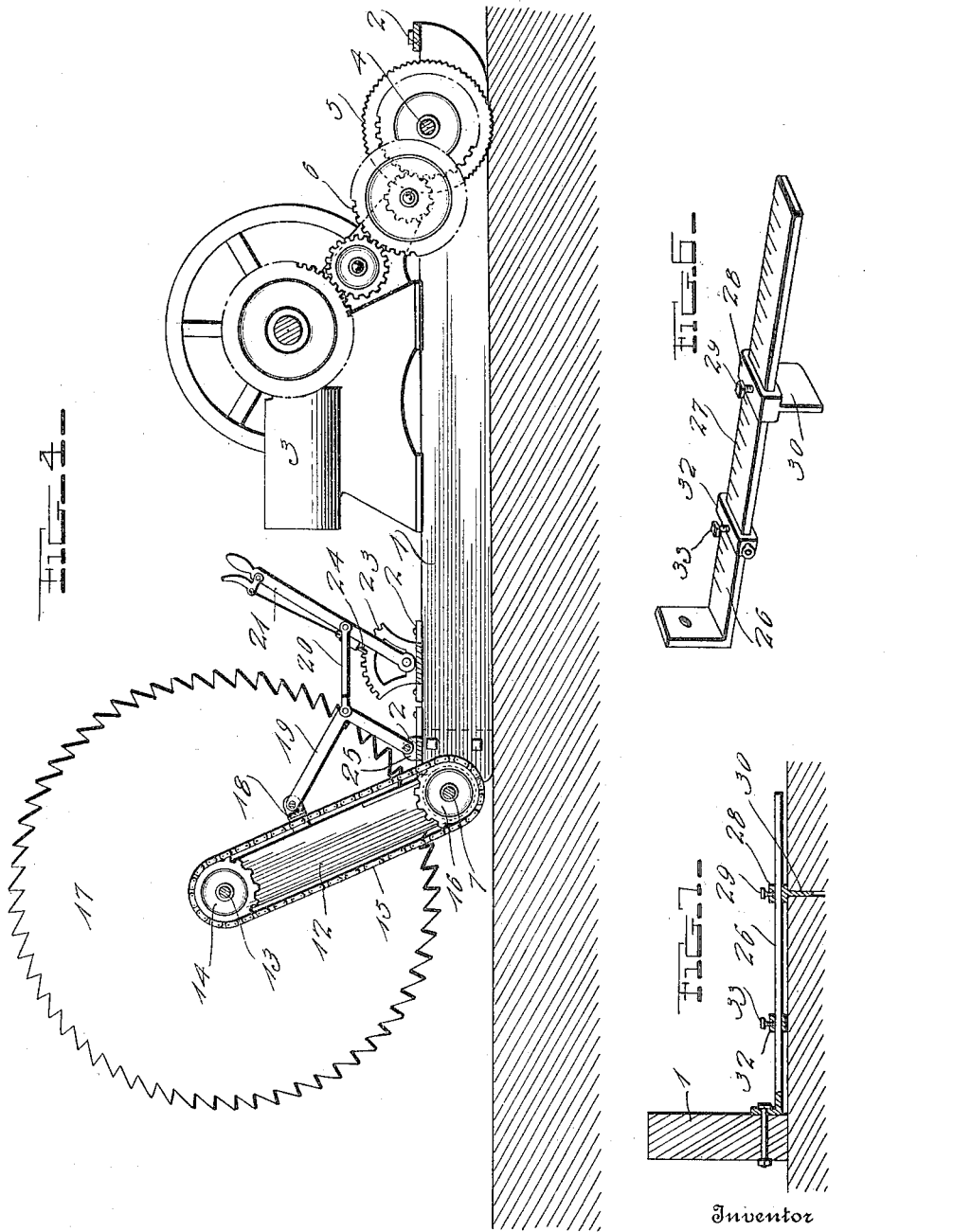

UNITED STATES PATENT OFFICE.

STANLEY O. MARAK, OF SWISHER, IOWA.

ICE-CUTTING MACHINE.

1,106,955.  Specification of Letters Patent.  Patented Aug. 11, 1914.

Application filed October 31, 1912. Serial No. 728,899.

*To all whom it may concern:*

Be it known that I, STANLEY O. MARAK, a citizen of the United States, residing at Swisher, in the county of Johnson and State of Iowa, have invented certain new and useful Improvements in Ice-Cutting Machines; and I do declare the following to be a full, clear, and exact description of the invention, such as will enable others skilled in the art to which it appertains to make and use the same.

This invention relates to improvements in ice cutting machines.

One object of the invention is to provide a machine of this character having an improved construction and arrangement of circular saw supporting and operating mechanism and means whereby the saw may be readily lowered and raised to operative and inoperative positions.

Another object is to provide an improved means for gaging the width of the ice between the cuts made by the saw and to guide the machine in its passage across the ice.

With these and other objects in view, the invention consists of certain novel features of construction, combination and arrangement of parts as will be more fully described and claimed.

In the accompanying drawings; Figure 1 is a side view of my improved ice cutting machine; Fig. 2 is a top plan view of the machine; Fig. 3 is a front end elevation thereof; Fig. 4 is a vertical longitudinal section of the same; Fig. 5 is a vertical cross sectional view taken on the line 5—5 of Fig. 1; Fig. 6 is a detail perspective view of one of the devices for gaging the width of the ice between the cuts made by the saw and which guides the machine in its passage across the ice; Fig. 7 is a detail vertical section taken on the line 7—7 of Fig. 1; Fig. 8 is a detail side view of a portion of the machine showing the pivotal connection of the saw carrying arms with the runners.

My improved ice cutting machine comprises a pair of runners 1 which are spaced a suitable distance apart and are connected by suitable cross bars 2 as shown. Mounted on the runners near the front end thereof is a suitable motor 3 and revolubly mounted in the runners between one end of the motor and the front end of the machine is a propelling shaft 4 on which is fixedly mounted a toothed driving or propelling wheel 5 the teeth of which when operated engage the surface of the ice and draw the machine across the same. The shaft 4 is connected to the driving shaft of the motor by a series of gears 6 whereby the propelling wheel is driven at the proper speed by said motor.

Revolubly mounted in the runners at the opposite end of the machine from that in which the driving mechanism is arranged is a counter shaft 7 on one end of which is fixed a pulley 8 which is connected by a belt 9 to a pulley 10 on the driving shaft of the motor as shown. Hingedly connected to the shaft 7 by suitable hinge plates 11 are saw supporting bars 12 which extend a suitable distance beyond the rear ends of the runners and in the outer ends of which is revolubly mounted a saw supporting and operating shaft 13. On the shaft between the bars 12 is fixedly mounted a sprocket gear 14 which is connected by a sprocket chain 15 with a sprocket gear 16 on the shaft 7, whereby the saw supporting shaft is driven in the proper direction. Fixedly mounted on one end of the shaft 13 at a suitable distance from one side of the machine is a circular ice cutting saw 17 which may be of any suitable size and construction and which is adapted when driven to cut the ice over which the machine is being drawn.

The saw supporting bars 12 are connected near their inner ends by a cross bar 18 to which is pivotally connected a saw adjusting frame 19. The frame 19 is pivotally connected by a link 20 to a saw adjusting lever 21 which is pivotally connected to the cross bars 2 which connects the runners at this end of the machine and on which is also secured a segmental rack 23 with which is engaged a pawl 24 carried by the lever 21, whereby the latter is locked to hold or support the bars 12 and saw 17 in their adjusted positions. The frame 19 is pivotally connected at its forward end to a bearing bracket 25 arranged on another cross bar 2 connecting the runners 1 at this end of the machine, whereby when the lever 21 is swung forwardly or rearwardly the frame 19 will be rocked and will raise or lower the saw supporting bars 12. When thus adjustably supported the saw may be held at such a position that the cuts formed in the ice by the saw will not extend clear through the ice but will terminate a suitable distance above the lower side of the sheet of ice thus leaving below the cuts an integral or uncut portion which will prevent the water from passing up into the cuts formed by the saw. But whether the saw cuts completely through the ice or not, its disposition at the extreme rear of the machine, and the disposition of the motor and the propelling means at the extreme front end of the machine, provides that the weight of the machine will be sustained by that portion of the ice which is not yet cut, as nothing rests on the strips between any two cuts. This is an important feature where the ice is thin, or in the springtime weakened by rain and otherwise, for a heavy machine of this character—carrying possibly one or two operators—might break through.

In order to regulate the width of the strips of ice between the cuts formed by the saw and to guide the machine in making successive cuts, I provide combined guiding and gaging devices comprising flat bars 26 which are suitably secured at their upturned inner ends 26′ in any suitable manner to the outer side of one of the runners and the saw supporting bar connected thereto, said bars being in sliding engagement by means of the collars 32 with the upper surface of the ice whereby the same are further supported and held in proper position. The bars 26 have on their upper sides adjacent to one edge graduated measuring scales 27, and slidably engaged with the bars 26 are gaging collars 28 which are secured in their adjusted positions on the bars by set screws 29. The collars 28 have formed on their lower sides depending guide plates 30 which are adapted to be engaged with the cuts previously formed by the saw thereby holding and guiding the machine in its movement across the ice. Any suitable number of gage bars 26 may be provided and the same are preferably braced and firmly held in position by obliquely disposed bracing rods 31 which are connected at their outer ends to collars 32. The collars 32 are engaged with the plates or bars 26 and are adjustably secured thereto by set screws 33 as shown.

From the foregoing description, taken in connection with the accompanying drawings, the construction and operation of the invention will be readily understood without requiring a more extended explanation.

Various changes in the form, proportion and the minor details of construction may be resorted to, without departing from the principle or sacrificing any of the advantages of the invention as claimed.

Having thus described my invention, what I claim is:

In an ice cutting machine the combination with a sled, a motor thereon, a saw mounted on one side of the sled, connections between the motor and saw, and means for raising and lowering the latter; of combined gage and guiding devices consisting of bars having upturned inner ends detachably secured on the other side of the sled and having their upper surfaces marked with graduations, said devices projecting at right angles from the last mentioned side of the sled and spaced along said side from end to end, collars adjustably mounted upon said bars, combined gage and guide plates depending rigidly from said collars, set screws carried by the collars and adapted to be brought into binding contact with the bars for holding the plates rigidly, other collars fixedly mounted upon the bars and brace rods leading from the last named collars to the sled, the lower surface of each of said collars being adapted to slide upon the ice, whereby the bars are held out of contact with the upper surface of the ice for the purpose set forth.

In testimony whereof I have hereunto set my hand in presence of two subscribing witnesses.

STANLEY O. MARAK.

Witnesses:
THESLEY SHEBETKA,
OTTO KANASEK.

Copies of this patent may be obtained for five cents each, by addressing the "Commissioner of Patents, Washington, D. C."